United States Patent
Shimma (10) Patent No.: US 8,077,575 B2
(45) Date of Patent: Dec. 13, 2011

(54) INFORMATION RECORDING METHOD THAT RECORDS MANAGEMENT INFORMATION FOR MANAGING DUMMY INFORMATION AS A FILE IN A USER DATA AREA

(75) Inventor: Naoki Shimma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 12/368,679

(22) Filed: Feb. 10, 2009

(65) Prior Publication Data

US 2009/0207711 A1    Aug. 20, 2009

(30) Foreign Application Priority Data

Feb. 18, 2008    (JP) ................................. 2008-036199

(51) Int. Cl.
*G11B 27/36*    (2006.01)
(52) U.S. Cl. ..................... 369/53.41; 711/100; 711/111; 711/112; 369/53.2; 369/53.24; 369/47.1
(58) Field of Classification Search ................ 711/100, 711/111–112; 369/53.2, 53.24, 53.41, 47.1
See application file for complete search history.

(56) References Cited

U.S. PATENT DOCUMENTS

| | | | |
|---|---|---|---|
| 7,333,411 B2 | 2/2008 | Miyawaki et al. | |
| 2003/0202782 A1* | 10/2003 | Motohashi et al. | ........... 386/125 |
| 2006/0087944 A1* | 4/2006 | Uemura et al. | .............. 369/53.2 |
| 2008/0002531 A1* | 1/2008 | Ogawa et al. | .............. 369/30.03 |

FOREIGN PATENT DOCUMENTS

| | | |
|---|---|---|
| JP | 2003-263842 A | 9/2003 |
| JP | 2004-213769 A | 7/2004 |
| JP | 2005-50444 | 2/2005 |

OTHER PUBLICATIONS

Japanese Office Action dated May 17, 2011, issued in counterpart Japanese patent application No. 2008-036199, with an English translation.

* cited by examiner

*Primary Examiner* — Jasmine Song
(74) *Attorney, Agent, or Firm* — Fitzpatrick, Cella, Harper & Scinto

(57) ABSTRACT

A method of recording information on a recording medium. The method includes determining whether an amount of information recorded in a user data area is equal to or greater than a predetermined value when a finalizing process is performed on the recording medium. The user data area is an area of the recording medium and is used for information recording. The method further includes padding an area subsequent to an area of the user data area in which the information is recorded, by recording dummy information, if the amount of the information is less than the predetermined value, and recording management information for managing the dummy information as a file, in the user data area, for dummy information that has been recorded halfway, if the padding is interrupted.

3 Claims, 9 Drawing Sheets

| OFFSET | LENGTH (Byte) | NAME |
|---|---|---|
| 0 | 2 | Length of Header (=L_HD) |
| 2 | 2 | Length of Implementation Use (=L_IU) |
| 4 | 128 | Logical Volume Identifier |
| 132 | 4 | Previous VAT ICB location |
| 136 | 4 | Number of FIDs identifying Files |
| 140 | 4 | Number of no-parent FIDs identifying Directories |
| 144 | 2 | Min UDF Read version |
| 146 | 2 | Min UDF Write version |
| 148 | 2 | Max UDF Write version |
| 150 | 2 | Reserved |
| 152 | L_IU | Implementation Use |
| 152+L_IU | 4 | VAT entry 0 |
| 156+L_IU | 4 | VAT entry 1 |
| ... | ... | ... |
| 152+(4*m)+L_IU | 4 | VAT entry m |
| ... | ... | ... |
| Information Length-4 | 4 | VAT entry n |

UDF2.00

INFORMATION RECORDING METHOD THAT RECORDS MANAGEMENT INFORMATION FOR MANAGING DUMMY INFORMATION AS A FILE IN A USER DATA AREA

This application claims the benefit of Japanese Patent Application No. 2008-036199, filed Feb. 18, 2008, which is hereby incorporated by reference herein in its entirety.

BACKGROUND OF THE INVENTION

1. Field of the Invention

The present invention relates to a method of recording information on a recording medium, and particularly, to a method of recording information on a recording medium, which requires a finalizing process to be performed after information recording, to ensure compatibility of a reproducing apparatus.

2. Description of the Related Art

As recording formats that require a finalizing process, there are, for example, the DVD-R (Digital Versatile Disc Recordable) format and the DVD-RW (Digital Versatile Disc ReWritable) format. For recording information on an optical disk compatible with these formats, it is necessary to ensure that the information can be reproduced by a reproducing apparatus compatible with a DVD-Video (Digital Versatile Disc Video) format. For this purpose, a finalizing process is performed on the disk such that reproduction compatibility is provided. A finalizing process is a process to arrange data so as to place a lead-in area and a lead-out area in an inner track and an outer track relative to a user data area of an optical disk, respectively. This process is necessary to enable information on a recording disk to be reproduced on DVD-Video reproducing apparatuses.

This finalizing process may be a process in which a lead-in area is allocated during formatting, and a lead-out area is allocated after information is recorded in a user data area, or may be a process in which after information is recorded in a user data area, a lead-in area and a lead-out area are allocated.

Figure 3A:
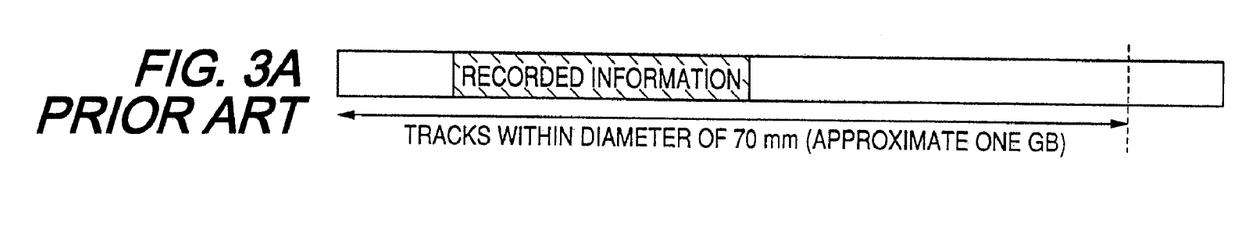
FIGS. 3A and 3B are diagrams illustrating a conventional finalizing processing method.
Figure 3B:
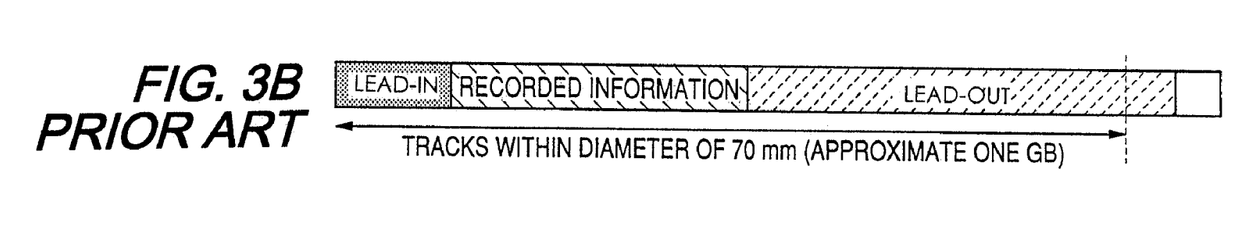

According to the DVD-Video format standard, some information is required to be recorded in an area of inner tracks within a diameter of 70 mm on a disk, which is approximately one GB when converted to the amount of information. If an amount of recorded information is less than one GB at the start of a finalizing process, as shown in FIG. 3A, a longer lead-out area is recorded, as shown in FIG. 3B, so that the process satisfies the above standard. However, because a recording operation cannot be interrupted during recording of a lead-out area, a user has to wait until completion of the recording processing of a lead-out area.

Figure 11A:
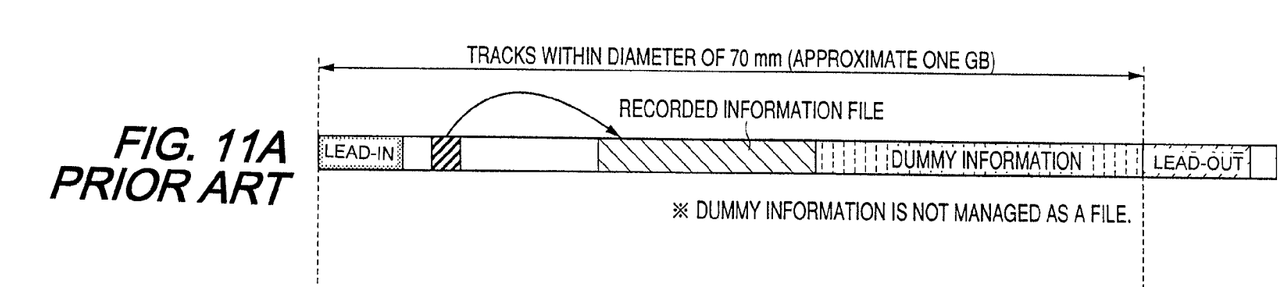
FIGS. 11A and 11B are diagrams illustrating a conventional padding method.
Figure 11B:
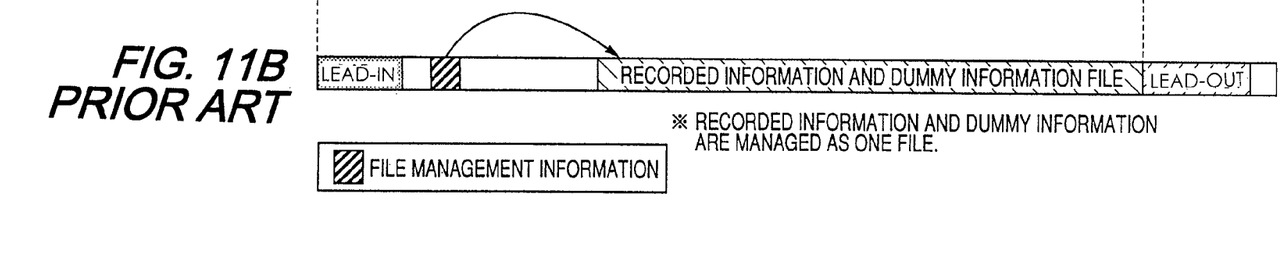

To address the above-described problem, Japanese Patent Application Laid-Open No. 2005-050444 proposes a method of performing a finalizing process in which, if an amount of recorded information is less than a regular amount value, dummy information (for example, zero data) is added to the end of a normal recorded information file, as shown in FIGS. 11A and 11B, so that information whose amount is equal to or greater than the regular amount value is recorded. FIG. 11A illustrates a method in which dummy information is not managed as a file, and FIG. 11B illustrates a method in which normal recorded information and dummy information are managed as one file. Whether recorded information is a file or not depends on whether or not management information for managing the information as a file is recorded or not. In FIGS. 11A and 11B, a solid arrow from management information points to a file managed by the management information. Specifically, in FIG. 11A, dummy information is not a file because management information for managing the dummy information as a file is not recorded. Recording of dummy information, as described above, is referred to as padding. In this method, a lead-out area to be recorded is not required to be longer, and, therefore, recording processing can be interrupted while dummy information to be added to a file is being recorded.

However, the method disclosed in Japanese Patent Application Laid-Open No. 2005-050444 does not manage dummy information as an independent file. Therefore, unless a special flag is used or management information is analyzed, it is impossible to determine whether a disk is in a state in which information has been recorded halfway by a user and a finalizing process is not yet applied, or in a state wherein a finalizing process has been interrupted.

SUMMARY OF THE INVENTION

It is an aspect of the present invention to provide an information recording method that allows a finalizing process to be interrupted and can determine whether a disk is a disk on which a finalizing process has been interrupted or not, without performing special processing.

To solve the above-described problems, according to an aspect of the present invention, a method of recording information on a recording medium according to the present invention includes determining whether or not an amount of information recorded in a user data area is equal to or greater than a predetermined value, when a finalizing process is performed on the recording medium, the user data area being an area of the recording medium and used for information recording, padding an area subsequent to the area in which the information is recorded, by recording dummy information in the subsequent area such that the amount of the information is equal to or greater than the predetermined value, if the amount of the information is less than the predetermined value, and recording management information for managing the dummy information as a file, in the user data area.

Further features of the present invention will become apparent from the following description of exemplary embodiments, with reference to the attached drawings.

DESCRIPTION OF THE EMBODIMENTS

Hereafter, an exemplary embodiment of the present invention will be described with reference to the drawings.

Figure 8:
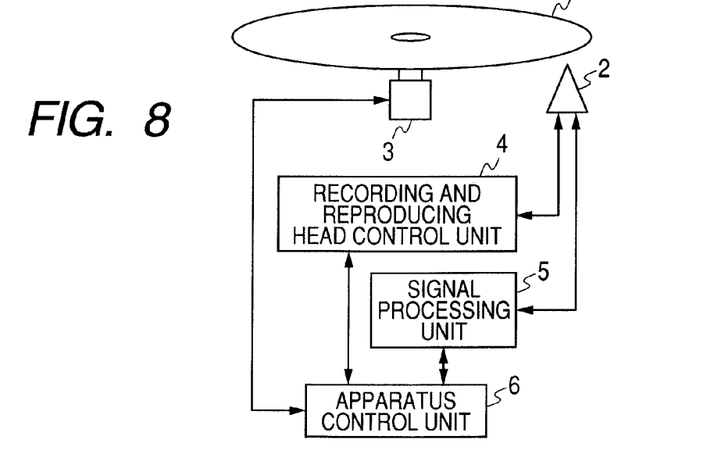
FIG. 8 is a diagram illustrating a structure of an information recording apparatus for implementing the present invention.

FIG. 8 is a block diagram illustrating an example of the structure of a recording and reproducing apparatus in which the information recording method of the present invention can be implemented. In FIG. 8, a recording medium 1 is a DVD-R, a DVD-RW, or the like, on which information can be recorded and from which information can be reproduced. A recording and reproducing head 2 performs recording and reproducing. A disk motor 3 rotates the recording medium 2. A recording and reproducing head control unit 4 performs position control of the recording and reproducing head 2. A signal processing unit 5 performs demodulation of a signal reproduced by the recording and reproducing head and modulation for recording by the recording and reproducing head. An apparatus control unit 6 controls the disk motor 3, the recording and reproducing head control unit 4 and the signal processing unit 5, based on the information recording method of the present invention.

The exemplary embodiment of the present invention will be described in detail below. FIGS. 1A-1E illustrate an example in which the information recording method of the present invention is applied to a rewritable disk, such as a DVD-RW. As a file management format for managing a file recorded on the DVD disk, the UDF (Universal Disk Format) standard is used. File Entry (hereafter referred to as FE) in FIGS. 1A-1E is management information for managing a start address of a file and a file size in the UDF standard. An area of the disk in which a real file is recorded can be recognized from FE. As described above, a finalizing process is a process to arrange data so as to allocate a lead-in area and a lead-out area in an inner track and an outer track of a user data area of an optical disk, respectively. This process is necessary to enable information on a recording disk to be reproduced on DVD-Video reproducing apparatuses.

This finalizing process may be a process in which a lead-in area is allocated during formatting, and a lead-out area is allocated after information is recorded in a user data area, or may be a process in which, after information is recorded in a user data area, a lead-in area and a lead-out area are allocated.

Figure 1A:
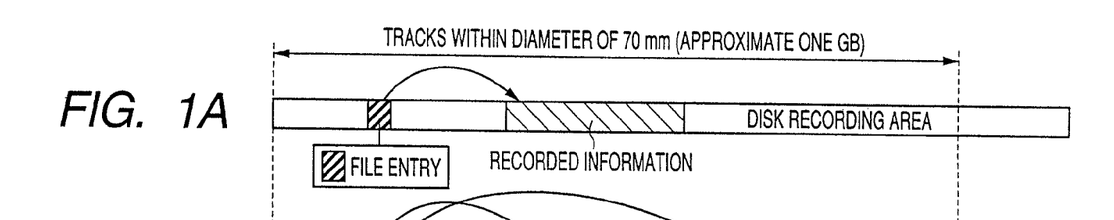
FIGS. 1A, 1B, 1C, 1D and 1E are diagrams illustrating an information recording method of the present invention, in a rewritable recording medium.
Figure 1B:
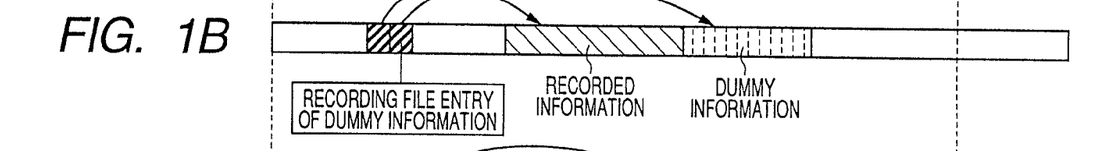

In FIGS. 1A-1E, a solid arrow from an FE points to a file indicated by the FE. In a state wherein the amount of recorded information on a rewritable disk is determined to be less than a predetermined value (e.g., one GB) as shown in FIG. 1A, when an instruction to perform a finalizing process is given from a user, dummy information (zero data) will be recorded following the recorded information. When an instruction to interrupt the process is given from the user during the recording of the dummy information, an FE is created and recorded in an unrecorded area of a user data area, as shown in FIG. 1B. This FE is management information indicating the start address and the size of the dummy information, which has already been recorded at this time point. When an instruction to resume the finalizing process is given from the user after the interruption of the process, the recording of the dummy information is resumed following the end address of the recorded area. At this time, since the end address of the recorded area is being managed by management information of the DVD's physical specifications, the end address is obtained with reference to this management information.

Figure 1C:
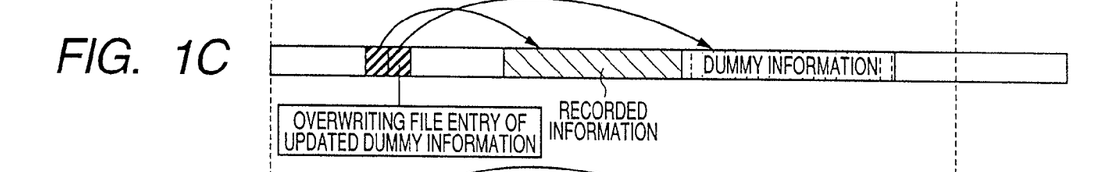
Figure 1D:
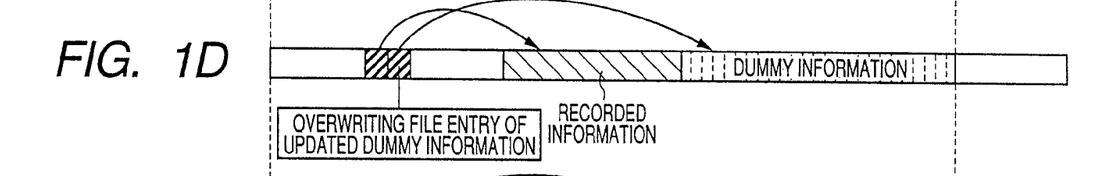
Figure 1E:
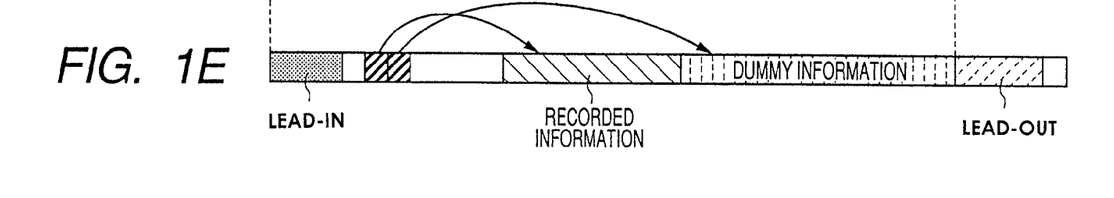

When an instruction to interrupt the process is given again from the user after the process is resumed, an FE of the updated dummy information, as shown in FIG. 1C, is created and written over the area in which the former dummy information's FE is recorded. From then on, each time the user gives instructions to resume and to interrupt the finalizing process, the FE of the dummy information is overwritten and updated as occasion arises, in a similar process. When dummy information is finally recorded up to the outer limit of tracks within a diameter of 70 mm on the disk, as shown in FIG. 1D, the FE of the updated dummy information is overwritten in a similar way, and lead-in and lead-out are recorded lastly, as shown in FIG. 1E, and the finalizing process is thus completed. The file of the dummy information is given a special name, which is different from a file name of the normal recorded information, so that the file of the dummy information is discriminated from other files.

An example of the present invention for a write-once disk, such as a DVD-R, will be described next. Because overwriting is not allowed on write-once disks, an FE of dummy information is updated using a Virtual Allocation Table (hereafter referred to as VAT), which is one of the functions of UDF. A VAT is an address translation table for converting an address of old management information to an address of new management information. More specifically, a virtual address recorded in an FE is substituted with a logical address recorded in a VAT, so as to convert old management information to new management information, so that pseudo-overwrite is achieved. Before processing on a write-once disk is described, pseudo-overwrite processing using a VAT will be described first.

Figure 6A:
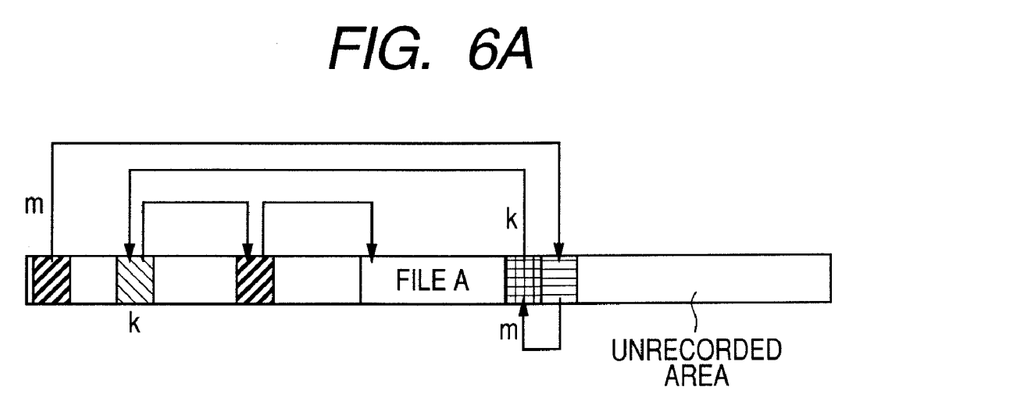
FIGS. 6A and 6B are diagrams illustrating a pseudo-overwrite using a virtual allocation table (VAT).
Figure 6B:
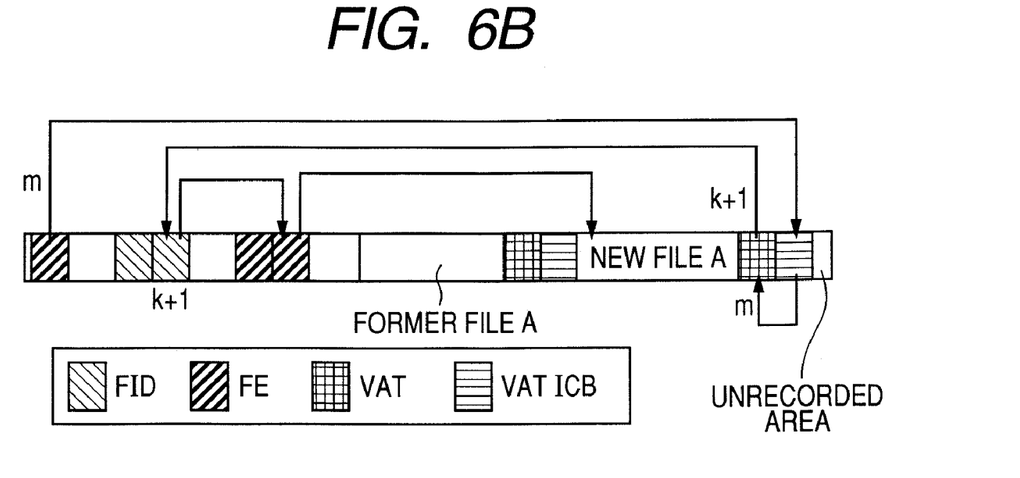

FIGS. 6A and 6B are diagrams illustrating overwrite processing of the file using VAT. When a VAT is used, management information called VAT ICB (Information Control Block) is recorded in the end address of a recorded area. This management information has a position and a size of the VAT itself as a parameter. VAT ICB has the same structure as that of the FE, though their names are different. Although, in general, a VAT itself is recorded in a recording area positioned immediately before that of a VAT ICB, its recording area is not particularly limited if it is an unrecorded area on the disk, because the recording position and size of the VAT are managed by the VAT ICB. Since the end address of a recorded area in which a VAT ICB is recorded is being managed by management information of the DVD's physical specifications, as in the case of DVD-RW, the position of the VAT ICB can be obtained with reference to this management information.

In FIG. 6A, in order to access a file A, the most left FE in FIG. 6A is referenced first. This FE indicates a directory in which the file A exists. A directory in the UDF is represented by management information called File Identifier Descriptor (hereafter referred to as FID), which manages directories and filenames under it and addresses of FEs indicating their positions. It is assumed here that an FID is recorded at a logical address k and an FE indicating it manages the FID at a virtual address m. Because it can be found that the position of the FID is recorded at virtual address m with reference to the FE, the VAT ICB recorded at the end address is accessed. Whether the position of the FID is recorded at a virtual address or a logical address can be determined from a Partition Reference Number, which is a parameter in the FE. Then, a VAT is accessed because the VAT ICB indicates the VAT. Then, virtual address m is converted to a logical address k by the VAT. The obtained logical address k allows access to the FID, which then allows access to the management information FE of the file A, and the file A sequentially.

When the file A is updated in the above situation, the updated file A (new file A in FIG. 6B) and new FID and FE for managing the new file A are recorded in different areas (the new FID is recorded at logical address k+1 in this example), as shown in FIG. 6B. In addition, new VAT and VAT ICB are also recorded. For accessing the new file A, the FE (most left FE in FIG. 6B) indicating the FID is accessed first, as in the case of FIG. 6A. Because the FE indicates the FID using virtual address m, the new recorded VAT is accessed via the VAT ICB. Because the recorded new VAT indicates that virtual address m is converted to logical address k+1, the FID existing at logical address k+1 allows access to the management information FE of the new file A, and the new file A sequentially.

Figure 7:
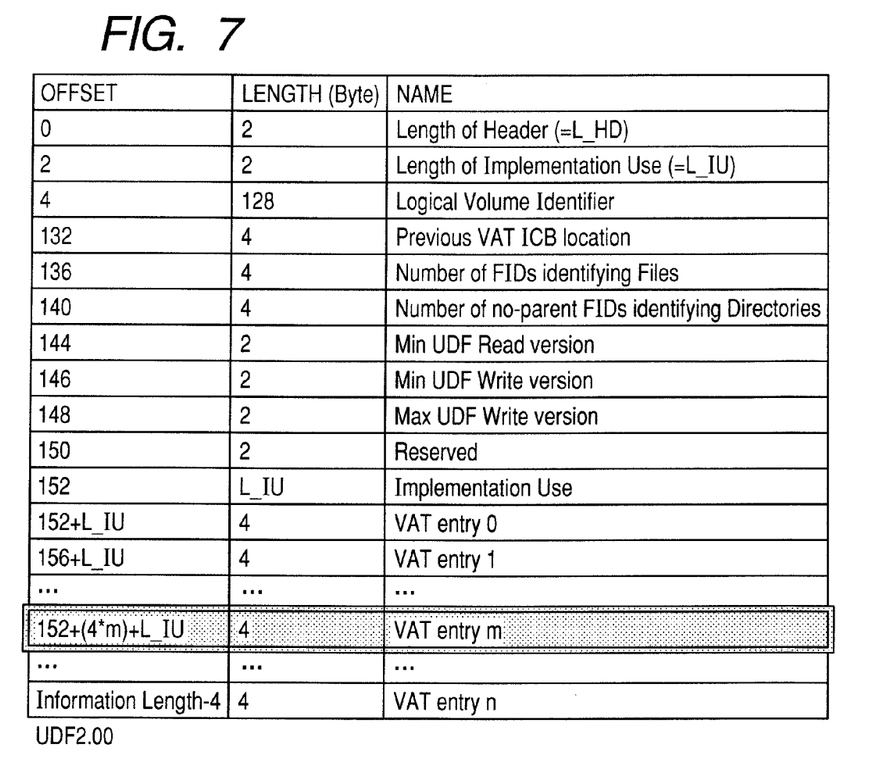
FIG. 7 is a diagram illustrating a structure of a virtual allocation table (VAT).

FIG. 7 illustrates an actual parameter structure in a VAT. Of parameters in a VAT, a parameter in which a logical address after substitution is stored is called a VAT Entry whose offset starts from 152+L_IU. Entry numbers starting from zero are assigned to VAT Entries, and a virtual address recorded in an FE, or the like, corresponds to such an entry number. Specifically, a VAT Entry whose entry number is the same value as a virtual address is retrieved, the address is converted to an address of the corresponding VAT Entry, and access is then performed using the converted address. In the examples shown in FIGS. 6A, 6B, in a VAT Entry m (a shading area in FIGS. 6A, 6B) whose entry number is the same value as a virtual address m of FE, k and k+1 are registered, respectively. As described above, when an already recorded file, or the like, is updated on a write-once disk, such as a DVD-R, the pseudo-overwrite processing using a VAT is performed as described above.

Figure 2A:
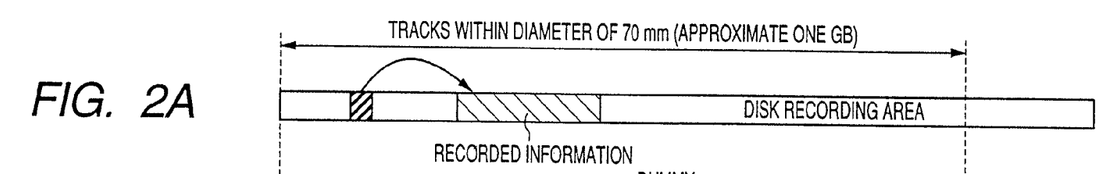
FIGS. 2A, 2B, 2C, 2D and 2E are diagrams illustrating an information recording method of the present invention, in a write-once recording medium.
Figure 2B:
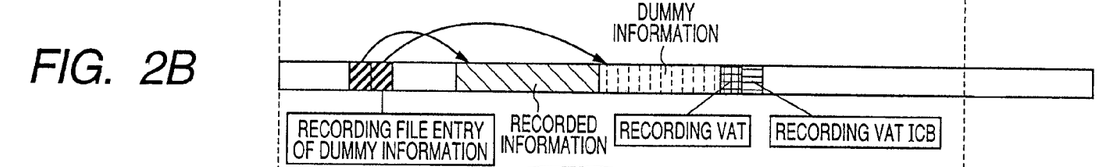
Figure 2C:
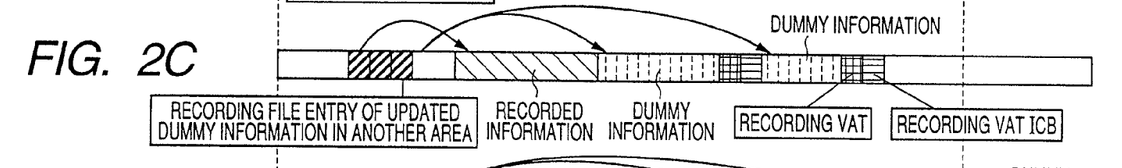

FIGS. 2A-2E illustrate dummy information update processing according to the present invention. In this illustration, only an FE indicating dummy information directly is added. However, in practice, an FID is also added, and the FE is accessed via the FID as described above. In a state wherein the amount of recorded information is less than one GB on a write-once disk, as shown in FIG. 2A, when an instruction to perform a finalizing process is given from a user, dummy information will be recorded following the recorded information. When an instruction to interrupt the process is given from the user during the recording of the dummy information, an FE is created and recorded in an unrecorded area of a user data area, as shown in FIG. 2B. This FE indicates the start address and the size of the dummy information that has already been recorded at this time point. Further, a VAT is recorded and a VAT ICB is recorded at the end address, and then, the process is interrupted. When an instruction to resume the finalizing process is given from the user after the interruption of the process, the recording of the dummy information is resumed following the VAT ICB recorded at the end address of the recorded area. When an instruction to interrupt the process is given again from the user, after the process is resumed, an FE of the updated dummy information, as shown in FIG. 2C, is created and recorded in an unrecorded area different from the area in which the former dummy information's FE is recorded. In addition, new VAT and VAT ICB are also recorded, so that access to the FE of the updated dummy information is allowed by the new VAT. The FE of the updated dummy information manages the dummy information, including the dummy information already recorded in FIG. 2B, and the newly recorded dummy information altogether, as one fragmentally recorded file. Details of a method of managing a fragmentally recorded file will be described later.

Figure 2D:
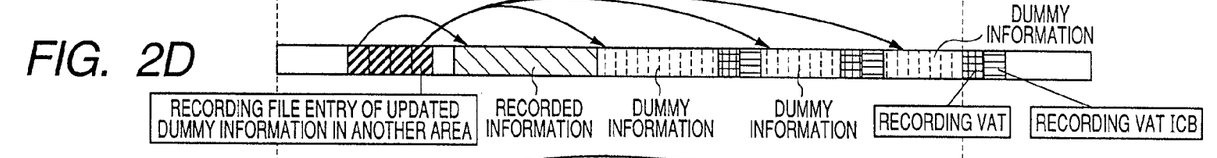
Figure 2E:
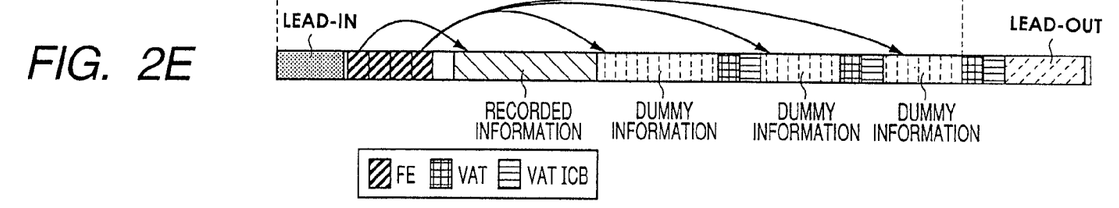

From then on, each time the user gives instructions to resume and to interrupt the finalizing process, dummy information's FE, VAT and VAT ICB are recorded and updated in different areas in a similar process, as occasion arises, so that the latest dummy information's FE can be accessed using VAT. When dummy information is finally recorded up to the limit of inner tracks within a diameter of 70 mm on the disk, as shown in FIG. 2D, the FE of the updated dummy information is recorded in a different area, in a similar way, and the latest VAT and VAT ICB are recorded. Lastly, lead-in and lead-out are recorded, as shown in FIG. 2E, and the finalizing process is thus completed.

The method of managing a fragmentally recorded file will now be described. In the UDF file format, file access is performed with reference to an Allocation Descriptor (hereafter referred to as AD), which is one of parameters in FE. In this AD, an address indicating a start position of a file and a file size are registered. A plurality of ADs can be registered in an FE in preparation for a situation where one file is fragmentally recorded on a disk. When a file has been fragmentally recorded, file management is performed using a plurality of ADs.

Figure 10:
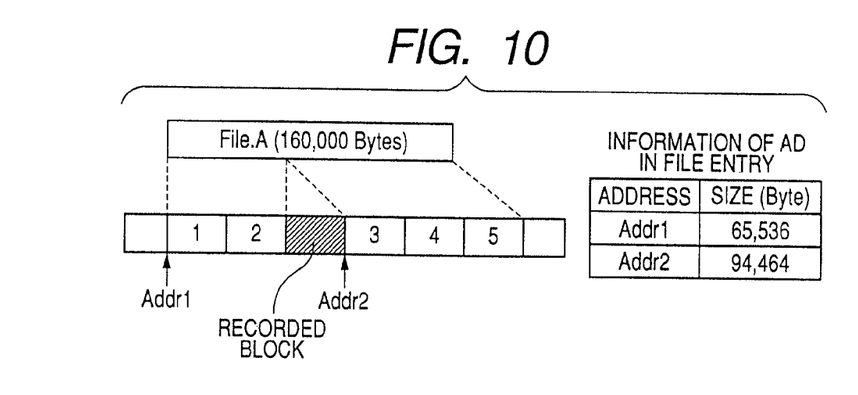
FIG. 10 is a diagram illustrating an address management method of a fragmentally recorded file.

FIG. 10 is a diagram illustrating a method of managing a fragmentally recorded file by ADs using the UDF file format. It is assumed here that a file "File.A" having a size of 160,000 [Byte], which is as large as five blocks, is to be recorded from address Addr 1 as shown in FIG. 10. Because there is a recorded block represented as a shading area, continuous five blocks from Addr 1 cannot be reserved. Therefore, as shown, File.A is fragmentally recorded in the first to fifth blocks in FIG. 10, while the recorded block is skipped. ADs in this case are illustrated in the table on the right side of FIG. 10. In an AD, the size of the information that is recorded continuously with the logical start address (Addr 1) of the first block is registered as a number of bytes. The size of one block in a DVD is 32,768 (Byte), and, therefore, 65,536 (Byte) corresponding to two blocks is registered as a size. Next, the logical start address (Addr 2) of the third block and the size of a remaining part of the file (160,000−65,536=94,464(Byte)) are registered. As illustrated in this example, a remaining file size is recorded as a size of an AD in the final row when the file size is not a multiple of a block size. During file access, access is performed in an order of these ADs.

Figure 4:
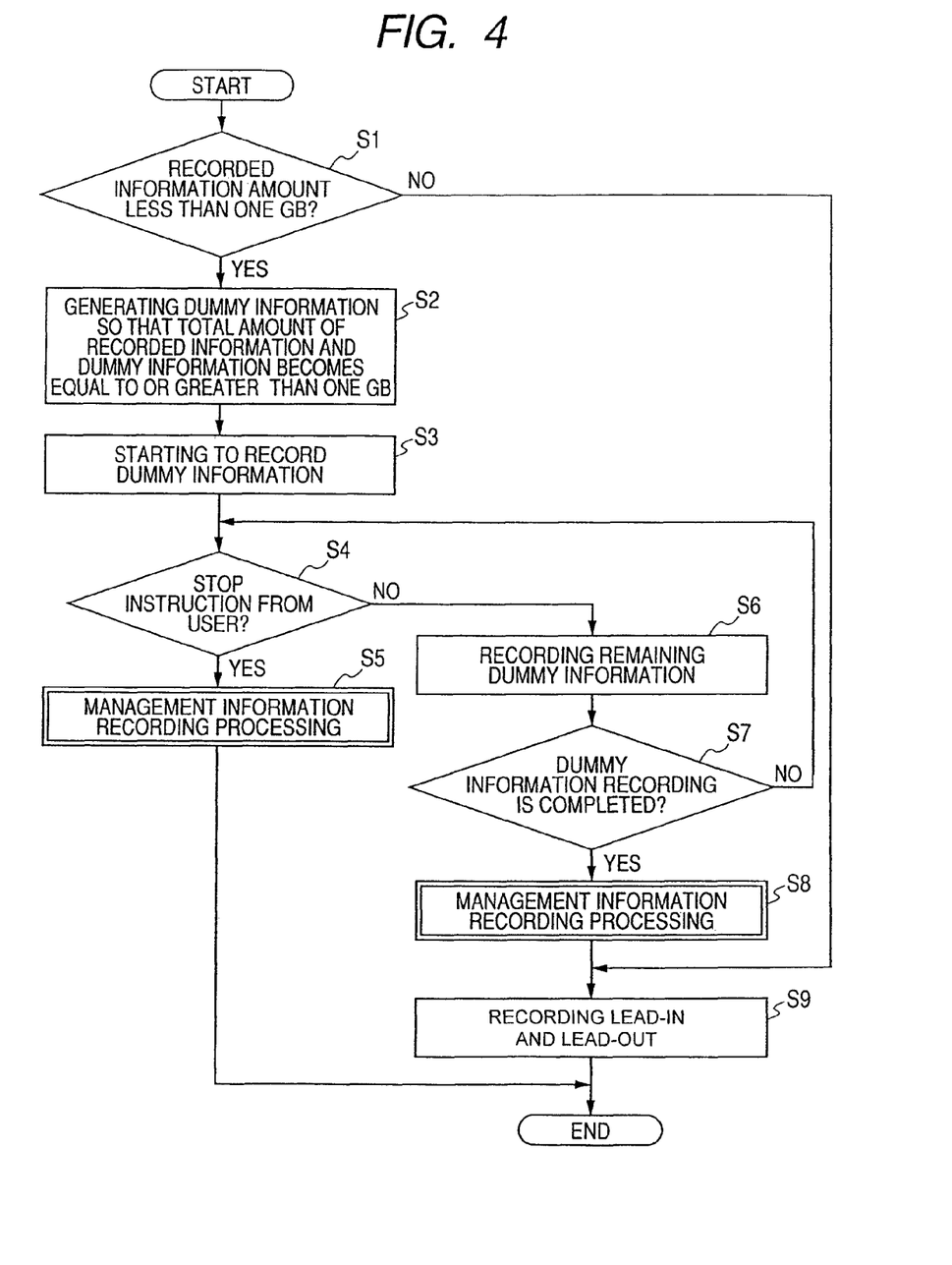
FIG. 4 is a flowchart of processing according to the present invention.

A flow of a finalizing process according to the present invention will be described with reference to the flowchart illustrated in FIG. 4. When an instruction to perform a finalizing process is given from a user, whether or not the amount of recorded information is equal to or greater than a predetermined value (greater or less than one GB in this example) is determined (S1). If the recorded information is equal to or greater than one GB, lead-in and lead-out are recorded (S9), and the finalizing process is then completed. If the recorded information amount is less than one GB, in step S1, dummy information is generated, so that the total amount of the recorded information and the dummy information becomes greater than one GB (S2), and recording of the dummy information is started (S3). If there is a stop instruction from a user during the recording of the dummy information (S4), recording processing of management information is performed (S5), and the process is then completed. Details of this management information recording processing will be described later. When an instruction to resume the finalizing process is given from the user, after the interruption of the finalizing process, the process is performed from the beginning of this flowchart. Also, from then on, recording processing is interrupted and resumed each time the user gives instructions to interrupt and to resume the finalizing process, until the dummy information recording processing is completed (S7).

After that, the latest dummy information's management information is recorded (S8), lead-in and lead-out is recorded (S9), and the finalizing process is completed.

Figure 5:
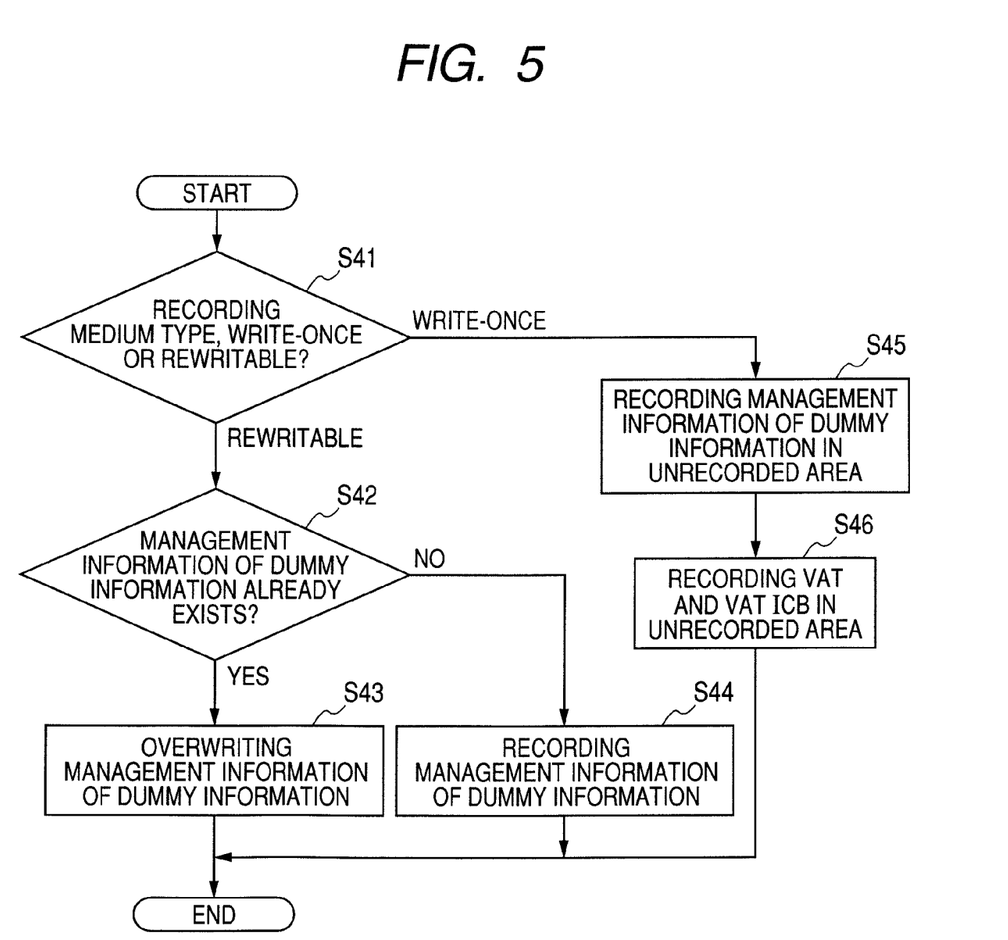
FIG. 5 is a flowchart of management information recording processing according to the present invention.

The management information recording processing shown in a double line box in FIG. 4 will be described next with reference to the flowchart of FIG. 5. First, in step S41, whether the type of the disk being finalized is rewritable or write-once is checked. If the type is write-once, management information of dummy information is recorded in an unrecorded area (S45), VAT and VAT ICB are recorded in the unrecorded area (S46), and the management information recording processing is then completed. If the type is rewritable in step S41, whether recorded management information of dummy information already exists or not is checked (S42). If management information of dummy information does not exist, management information of dummy information is recorded in the unrecorded area on the disk (S44), and the management information recording processing is then completed. If it is determined that recorded management information of dummy information already exists in step S42, new management information of the dummy information is written over the recorded management information in the next step (S43), and the management information recording processing is then completed.

For example, there is a case in which, during a finalizing process, a user wants to record new information on a disk on which the finalizing process has been performed. In such a case, by the configuration of the recording apparatus and the recording method, as described above, the finalizing process can be interrupted and the information can be recorded on the same disk. Further, by the configuration of the recording apparatus and the recording method, it is allowed that a finalizing process is interrupted, the disk is changed to another one, and information is recorded thereon, and then, the finalizing process is resumed on the former disk, on which the finalizing process has been performed halfway.

Figure 9A:
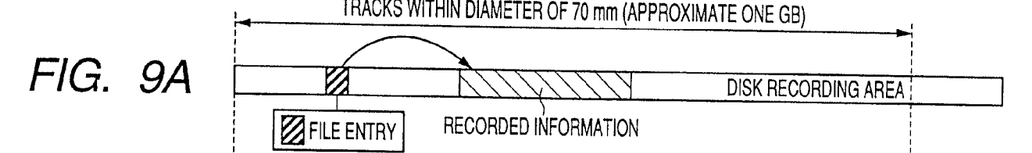
FIGS. 9A, 9B, 9C, 9D and 9E are diagrams illustrating a method of recording a normal file after interruption of a finalizing process.
Figure 9B:
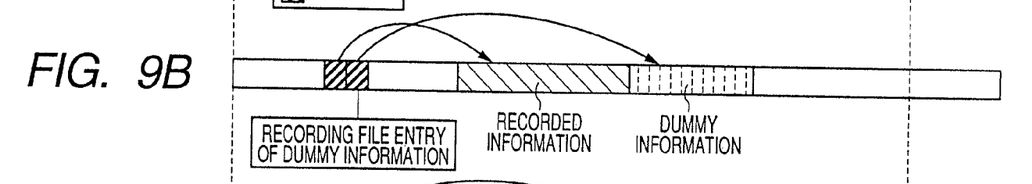
Figure 9C:
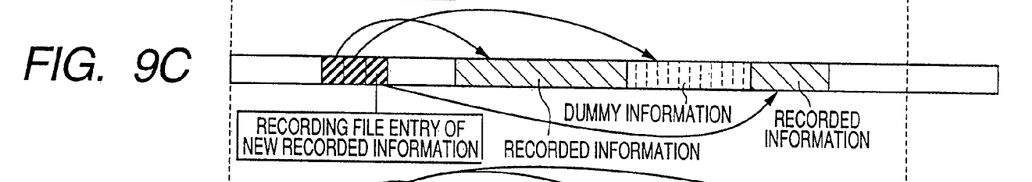
Figure 9D:
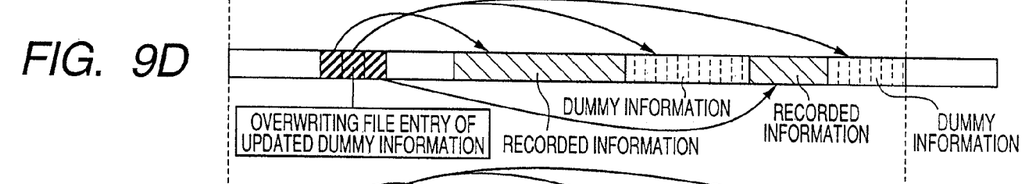
Figure 9E:
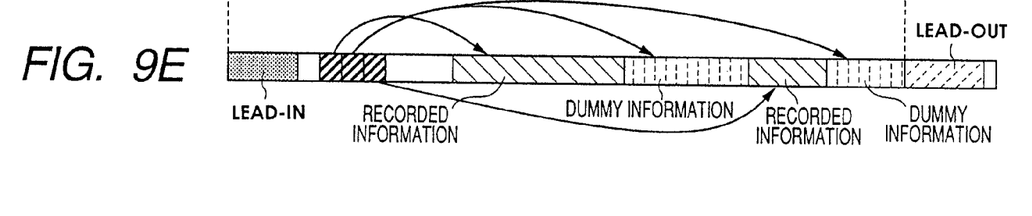

FIGS. 9A-9E are diagrams illustrating a method of recording new information on a rewritable recording medium after interrupting a finalizing process. As with the cases described above, when an instruction to perform a finalizing process is given in a state wherein the size of the recorded information does not reach the outer limit of tracks within a diameter of 70 mm on the disk, as shown in FIG. 9A, dummy information will be recorded following the end address of the recorded information. Then, when an instruction to interrupt the finalizing process is given from the user, management information of the recorded dummy information is recorded, as shown in FIG. 9B, and the finalizing process is interrupted. When an instruction to record new information is given from the user, after the interruption of the finalizing process, new information is recorded following the end address of the recorded information, as shown in FIG. 9C, and an FE for managing this new information is recorded in an unrecorded area. When an instruction to perform the finalizing process is given again from the user, dummy information is recorded again following the end address of the recorded information. However, if information has already been recorded up to the outer limit of tracks within a diameter of 70 mm, in the state of FIG. 9C, recording of subsequent dummy information is not performed, and lead-in and lead-out are recorded, and the finalizing process is completed. When the dummy information finally reaches the outer limit of tracks within a diameter of 70 mm on the disk, as shown in FIG. 9D, lead-in and lead-out are recorded, as shown in FIG. 9E, and the finalizing process is completed. Although interruption of a finalizing process and recording of new information are performed only once in the above description, it is apparent that interruption of a finalizing process and recording of new information can be performed any number of times, as far as a recording area of a disk is available. As for a write-once disk, a finalizing process can be interrupted, and new information can be additionally written in a similar way.

The present invention is not limited to the above-described exemplary embodiment, and can be applied in various ways without departing from the scope of the present invention. For example, although VAT is used for update processing of management information in the above description, update processing may be performed using Logical Overwrite, which is employed by UDF revision 2.60. For example, a dummy information file may be discriminated from a normal recorded information file by modification to a file attribute instead of a file name. Particularly, a parameter, such as File Characteristics of FID or File Type of FE of a dummy information file, is changed to a different one (for example, a hidden file attribute) from normal files, so that the dummy information file is discriminated. Alternatively, a directory dedicated to dummy information files may be created such that a dummy information file is recorded under this directory. Thereby, the dummy information can be discriminated from other files. Further, since dummy information is managed as a file and thus can be discriminated from other data, padding data may be data other than zero data. Further, although former dummy information and new dummy information are managed as one file in the embodiment for a write-once disk, it is conceivable that only new dummy information is managed as a file and former dummy information is treated as a deleted file. Further, instead of managing all dummy information as one file, a plurality of dummy information files may be created by adding a dummy information file each time a finalizing process is interrupted. When dummy information is managed as a plurality of files, management information of an already recorded dummy information file is not updated, and management information of a new dummy information file is recorded.

As described above, according to the present invention, interruption of a finalizing process is allowed and whether or not a disk is a disk on which a finalizing process has been interrupted can be determined without special processing. Further, after interruption of the finalizing process, a normal file can be recorded on the same disk, on which the finalizing process has been interrupted.

Furthermore, needless to say, the object of the present invention can be achieved even by supplying a recording medium storing a program code of software realizing the function of the above-mentioned embodiment in a system or an apparatus, and allowing a computer (or a CPU or an MPU) of the system or the apparatus to read the program code stored in the recording medium for execution.

In this case, the program code itself read from the recording medium realizes the function of the above-mentioned embodiment, and the program code itself and the recording medium storing the program code constitute the present invention.

As the recording medium for supplying a program code, for example, a flexible disk, a hard disk, an optical disk, a magnetooptical disk, a CD-ROM, a CD-R, a magnetic tape, a nonvolatile memory card, or a ROM can be used.

Furthermore, needless to say, by executing the program code read by the computer, the function of the above-mentioned embodiment can be realized, and also, an OS (basic system or an operating system) operated on the computer performs partial or entire actual processing in accordance with an instruction of the program code, whereby the function of the above-mentioned embodiment can be realized by that processing.

Furthermore, needless to say, after the program code read from the recording medium is written in a memory provided in a function extension board inserted in a computer or a function extension unit connected to the computer, a CPU, or the like, provided in the function extension board or the function extension unit performs partial or entire actual processing in accordance with an instruction of the program code, whereby the function of the above-mentioned embodiment can be realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of recording information on a recording medium, the method comprising:
   determining whether an amount of information recorded in a user data area is equal to or greater than a predetermined value when a finalizing process is performed on the recording medium, the user data area being an area of the recording medium and used for information recording;
   padding an area subsequent to an area of the user data area in which the information is recorded, by recording dummy information, if the amount of the information is less than the predetermined value; and
   recording management information for managing the dummy information as a file, in the user data area, the recording step including recording the management information for managing as a file dummy information that has been recorded halfway, in the user data area, if the padding is interrupted.

2. The method according to claim 1,
   wherein the recording medium is rewritable, and further comprising writing management information for managing updated dummy information over the management information recorded when the padding is interrupted, if the interrupted padding is resumed.

3. The method according to claim 1,
   wherein the recording medium is write-once, and further comprising recording management information for managing updated dummy information in an unrecorded area of the user data area, which is different from an area in which the management information recorded when the padding is interrupted is recorded, if the interrupted padding is resumed.

* * * * *